(12) United States Patent
Kim et al.

(10) Patent No.: US 11,538,149 B2
(45) Date of Patent: Dec. 27, 2022

(54) SPOT DETECTION DEVICE, SPOT DETECTION METHOD, AND DISPLAY DEVICE

(71) Applicant: Samsung Display Co., Ltd., Yongin-Si (KR)

(72) Inventors: Seyun Kim, Hwaseong-si (KR); Hoisik Moon, Hwaseong-si (KR); Mingyu Kim, Hwaseong-si (KR); Sangcheol Park, Hwaseong-si (KR); Jae-Seok Choi, Uijeongbu-si (KR)

(73) Assignee: Samsung Display Co., Ltd.

( * ) Notice: Subject to any disclaimer, the term of this patent is extended or adjusted under 35 U.S.C. 154(b) by 39 days.

(21) Appl. No.: 16/894,660

(22) Filed: Jun. 5, 2020

(65) Prior Publication Data

US 2021/0035275 A1 Feb. 4, 2021

(30) Foreign Application Priority Data

Jul. 31, 2019 (KR) .................... 10-2019-0092931
Aug. 27, 2019 (KR) .................... 10-2019-0104935

(51) Int. Cl.
*G06T 7/00* (2017.01)

(52) U.S. Cl.
CPC .................. *G06T 7/001* (2013.01)

(58) Field of Classification Search
CPC ........... G06T 7/001; G06T 2207/10016; G06T 2207/30121; G06T 2207/30168; G01N 21/95
See application file for complete search history.

(56) References Cited

U.S. PATENT DOCUMENTS

| 5,696,550 A * | 12/1997 | Aoki | G02F 1/1303 348/125 |
|---|---|---|---|
| 9,880,109 B2 | 1/2018 | Kim et al. | |
| 2003/0059101 A1* | 3/2003 | Safaee-Rad | G06T 7/0004 382/141 |
| 2005/0232476 A1* | 10/2005 | Hayakawa | G09G 3/006 382/141 |
| 2007/0047801 A1* | 3/2007 | Kojima | G09G 3/006 382/149 |
| 2007/0071304 A1* | 3/2007 | Kuchii | G06T 7/0004 382/141 |
| 2008/0001869 A1* | 1/2008 | Chung | G09G 3/3648 345/87 |

(Continued)

FOREIGN PATENT DOCUMENTS

| KR | 10-2014-0073259 A | 6/2014 |
|---|---|---|
| KR | 10-2014-0121068 A | 10/2014 |

(Continued)

*Primary Examiner* — Sath V Perungavoor
*Assistant Examiner* — Tyler B Edwards
(74) *Attorney, Agent, or Firm* — Innovation Counsel LLP

(57) ABSTRACT

Provided is a spot detection device including an imager configured to capture a display panel displaying a first image of a first grayscale and a second image of a second grayscale different from the first grayscale and generate image data, and a spot detector configured to receive the image data from the imager in order to detect a spot. The image data includes first image data obtained by capturing the first image, second image data obtained by capturing the second image, and a plurality of third image data obtained by capturing portions of the first image.

20 Claims, 21 Drawing Sheets

(56) References Cited

U.S. PATENT DOCUMENTS

2016/0012759 A1    1/2016  Kim et al.
2020/0135073 A1*  4/2020  Kim ......................... G06T 7/70

FOREIGN PATENT DOCUMENTS

| KR | 10-1492336 B1 | 2/2015 |
| KR | 10-2016-0006852 A | 1/2016 |
| KR | 10-1635461 B1 | 7/2016 |
| KR | 10-1716111 B1 | 3/2017 |

* cited by examiner

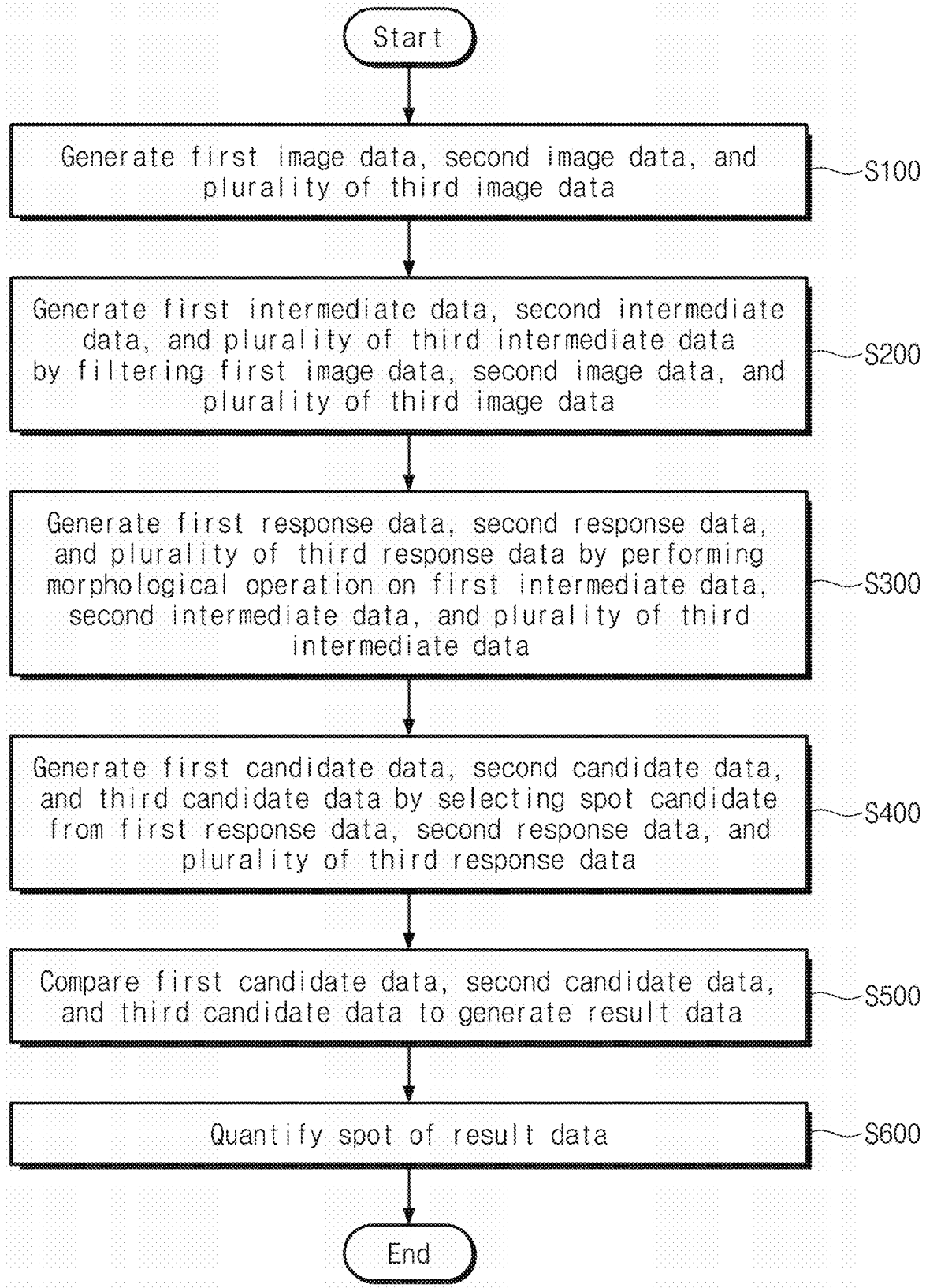

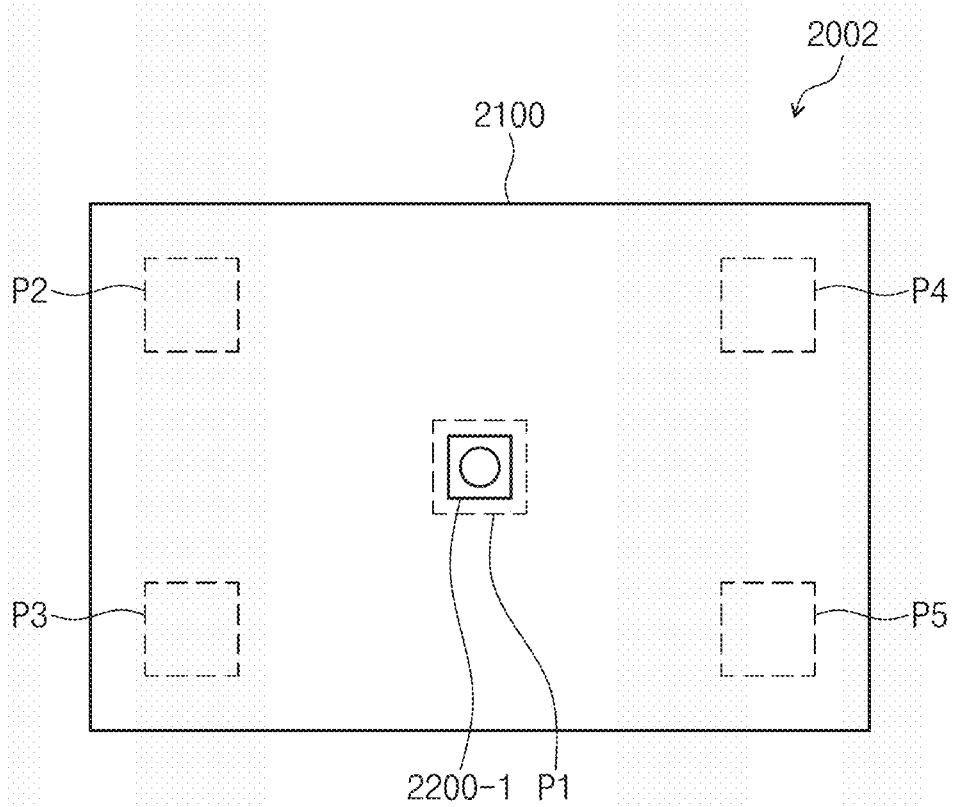

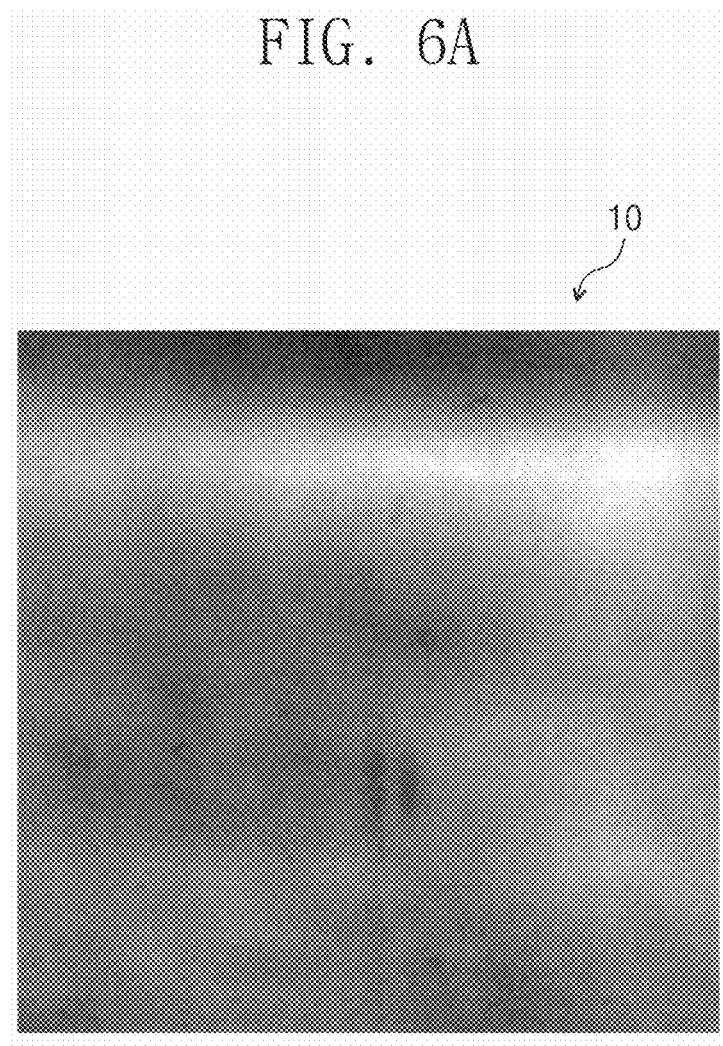

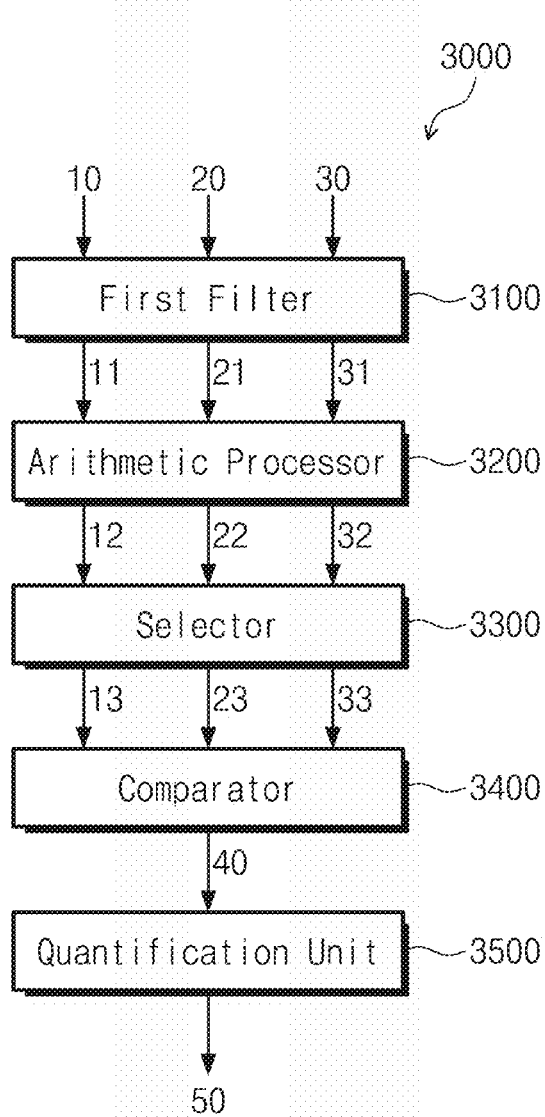

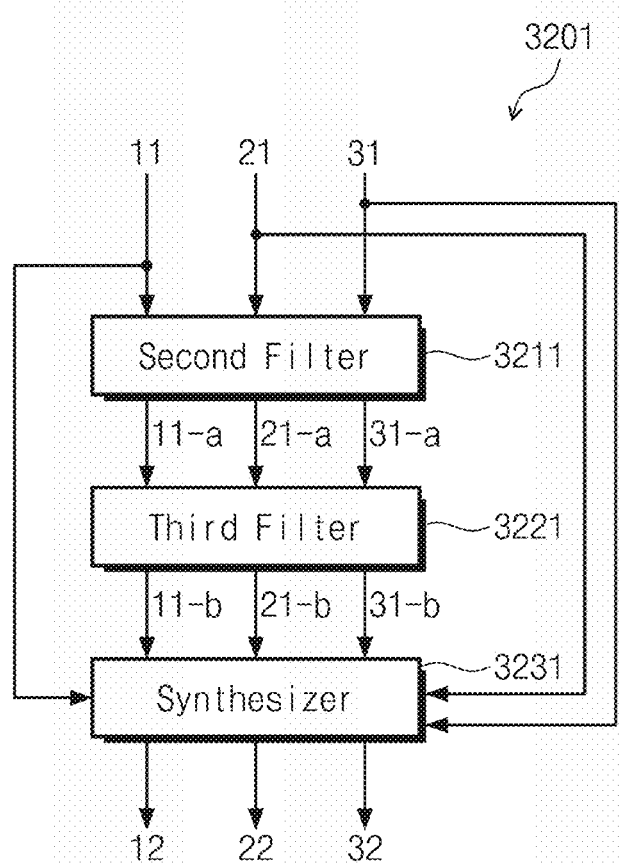

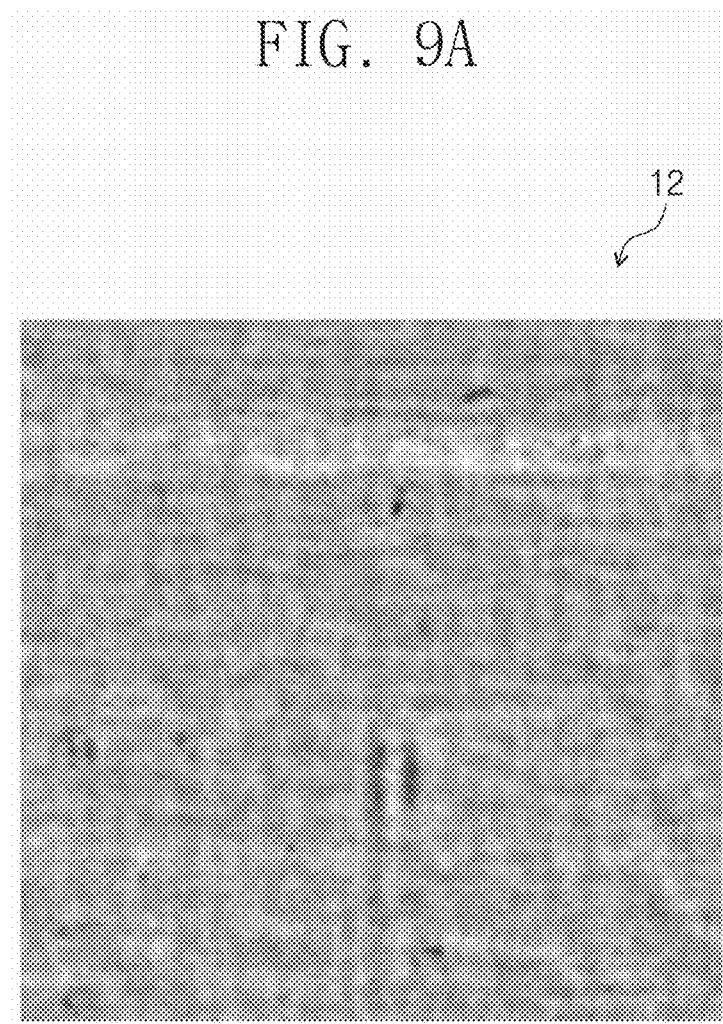

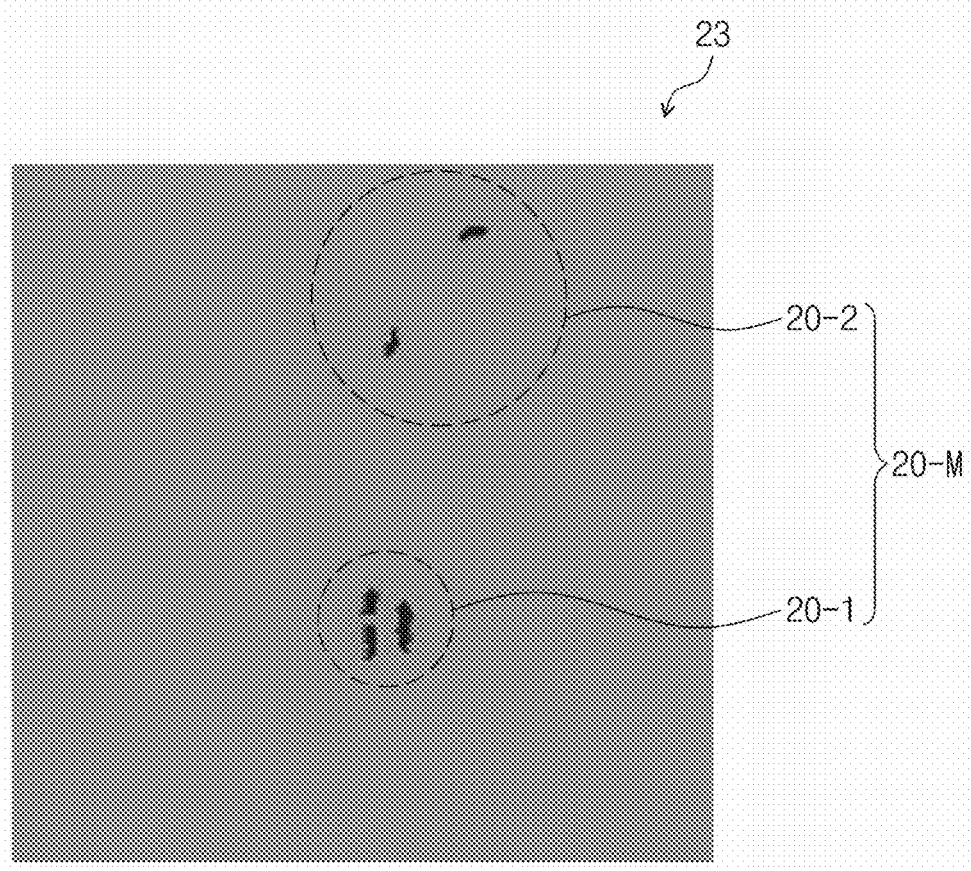

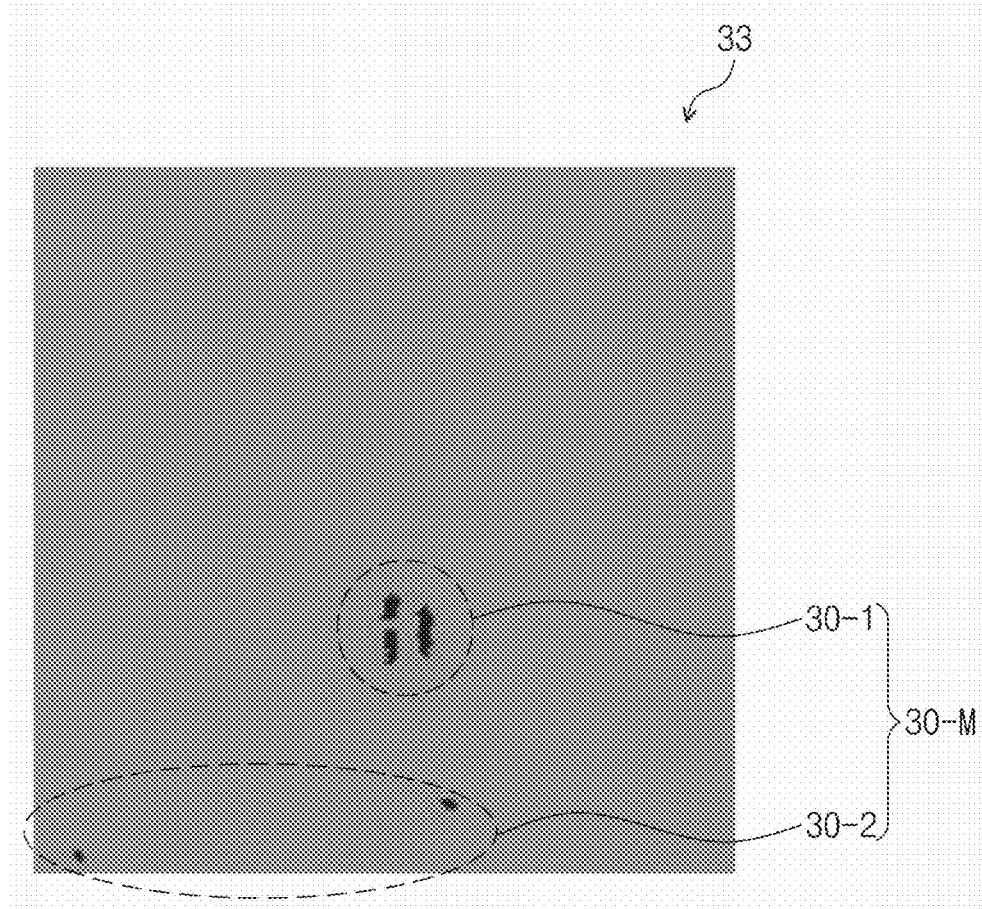

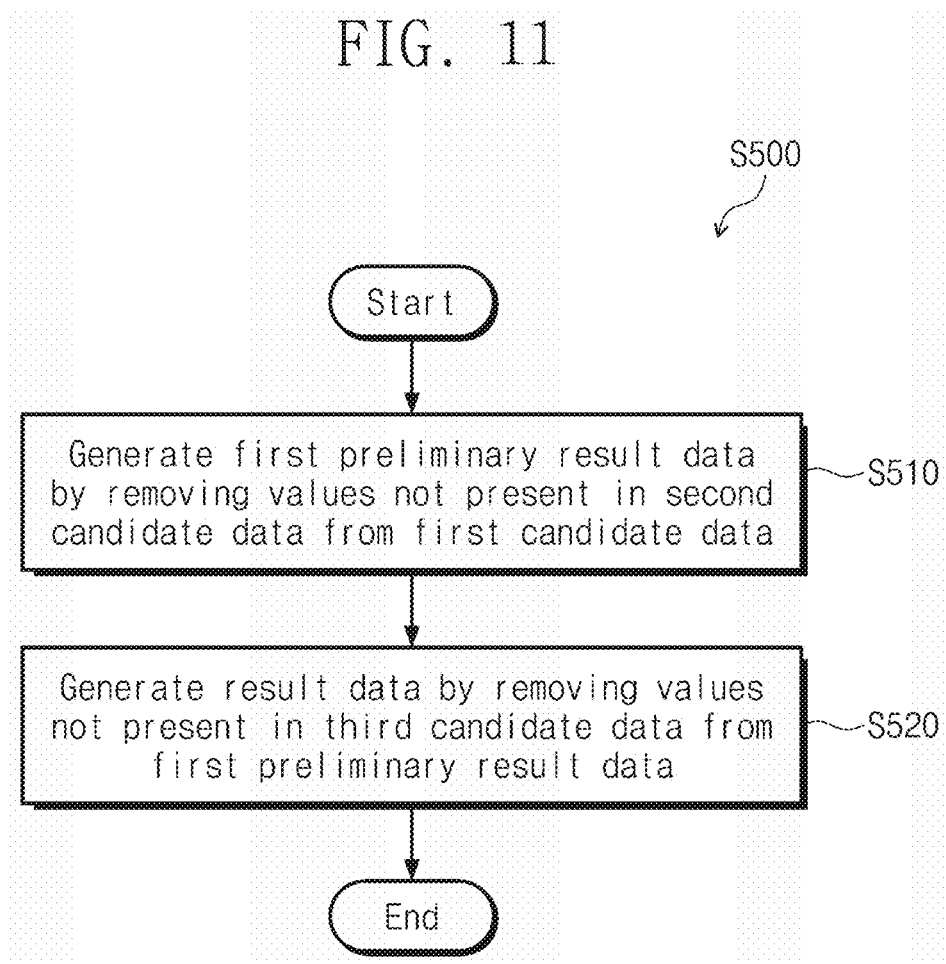

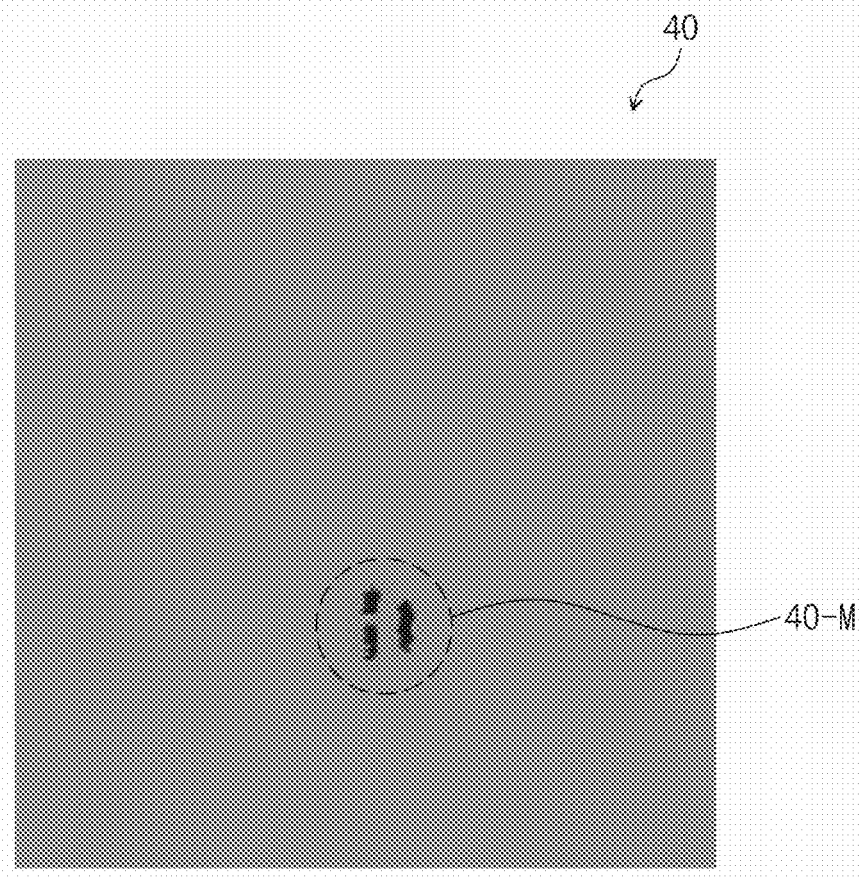

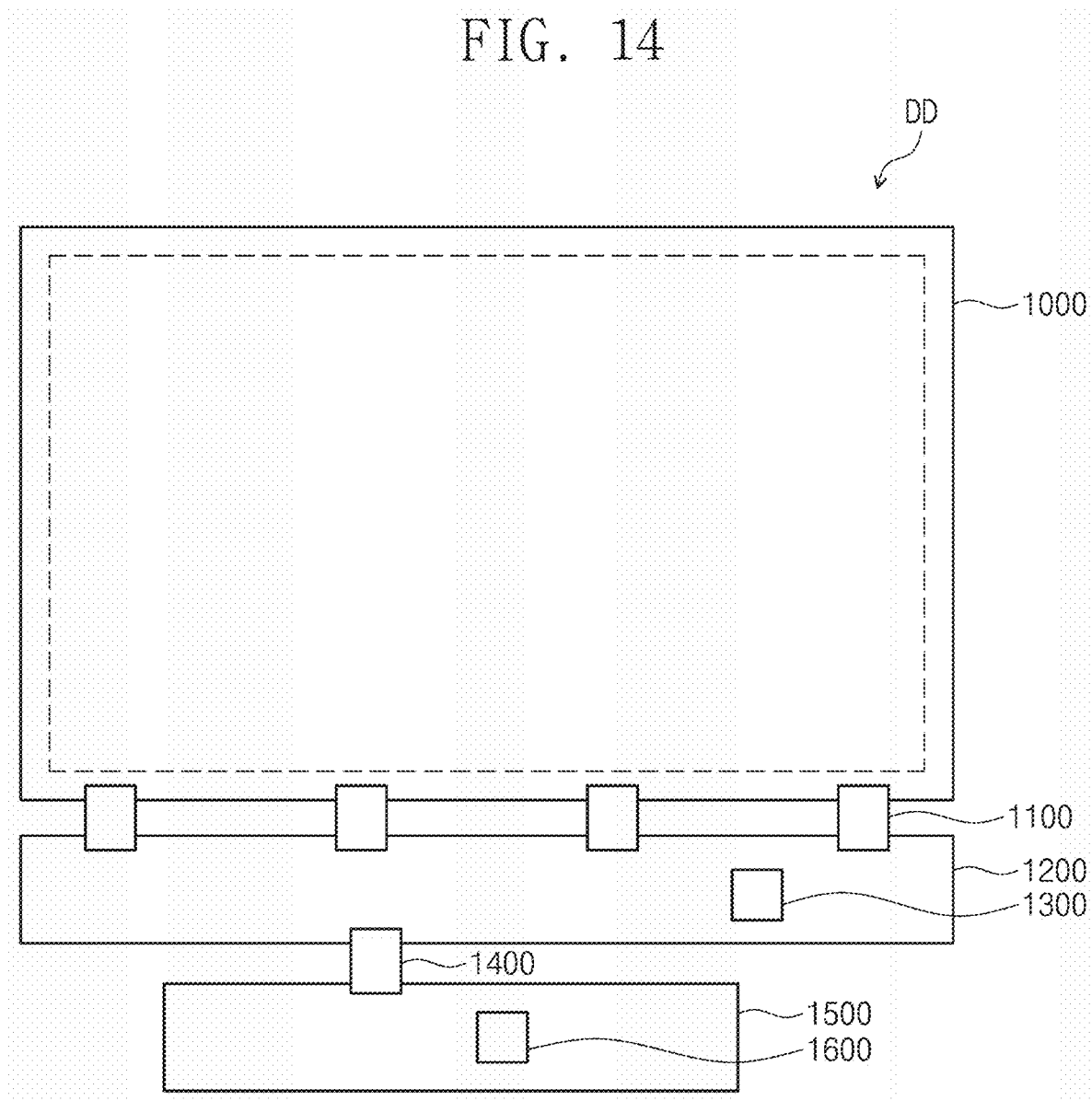

SPOT DETECTION DEVICE, SPOT DETECTION METHOD, AND DISPLAY DEVICE

CROSS-REFERENCE TO RELATED APPLICATIONS

This U.S. non-provisional patent application claims priority under 35 U.S.C. § 119 of Korean Patent Application Nos. 10-2019-0092931, filed on Jul. 31, 2019, and 10-2019-0104935, filed on Aug. 27, 2019, the entire contents of which are hereby incorporated by reference.

BACKGROUND

Technical Field

The present disclosure relates to a display device. Particularly, the present disclosure relates to a spot detection device with improved spot detection reliability, a spot detection method, and a display device having information on detected spots.

BACKGROUND INFORMATION

After a display panel is manufactured, a spot inspection process may be performed to inspect spots or scratches on the display panel during an operating state of the display panel. Through the spot inspection process, spots of various patterns may be inspected by various inspecting devices. Once, the spots are detected, the spots may be corrected by reflecting the inspected results.

SUMMARY

The present disclosure provides a spot detection device and a spot detection method with improved spot detection reliability.

The present disclosure also provides a display device having information on a spot detected by a spot detection device and a spot detection method.

An embodiment of the present disclosure provides a spot detection device including an imager configured to capture a display panel displaying a first image of a first grayscale and a second image of a second grayscale different from the first grayscale and generate a plurality of image data, and a spot detector configured to receive the image data from the imager in order to detect a spot, wherein the image data includes first image data obtained by capturing the first image, second image data obtained by capturing the second image, and a plurality of third image data obtained by capturing portions of the first image.

In an embodiment, the imager may include a first camera for capturing an entire display area of the display panel, and a second camera for capturing a one portion of the display area.

In an embodiment, the imager may further include a third camera for capturing another portion of the display area.

In an embodiment, the second camera may capture a portion of the display area from a first position, and capture another portion of the display area from a second position different from the first position.

In an embodiment, the imager may include a camera, wherein the camera may obtain the first image data and the second image data at a first position, and obtain some of the plurality of third image data at a second position different from the first position.

In an embodiment, the spot detector may include a first filter for removing impulsive noise from the first image data, the second image data, and the plurality of third image data, wherein the first filter may convert the first image data, the second image data, and the plurality of third image data into first intermediate data, second intermediate data, and a plurality of third intermediate data through an intermediate value filter.

In an embodiment, the spot detector may further include an arithmetic processor for removing noise from the first intermediate data, the second intermediate data, and the plurality of third intermediate data, wherein the arithmetic processor may convert the first intermediate data, the second intermediate data, and the plurality of third intermediate data into first response data, second response data, and plurality of third response data, respectively, through a morphological operation process.

In an embodiment, the arithmetic processor may include a first maximum value filter configured to filter the first intermediate data, the second intermediate data, and the plurality of third intermediate data with a mask having a size of a*a, a first minimum value filter configured to filter a set of data filtered by the first maximum value filter with a mask having a size of 2a+1*2a+1, a second minimum value filter configured to filter the first intermediate data, the second intermediate data, and the plurality of third intermediate data with a mask having a size a*a, a second maximum value filter configured to filter a set of data filtered by the second minimum value filter with a mask having a size of 2a+1*2a+1, an averager configured to average data filtered by the first minimum value filter and a set of data filtered by the second maximum value filter, and a synthesizer configured to generate the first response data, the second response data, and the plurality of third response data by respectively removing average data derived by the averager from the first intermediate data, the second intermediate data, and the plurality of third intermediate data.

In an embodiment, the arithmetic processor may include a second filter configured to filter the first intermediate data, the second intermediate data, and the plurality of third intermediate data with a mask having a size of a*a, a third filter configured to filter a set of data filtered by the second filter with a mask having a size of 2a+1*2a+1, and a synthesizer configured to generate the first response data, the second response data, and the plurality of third response data by removing a set of data filtered by the third filter from the first intermediate data, the second intermediate data, and the plurality of third intermediate data.

In an embodiment, the spot detector may further include a selector configured to select a spot candidate of the first response data, the second response data, and the plurality of third response data, wherein the selector may convert the first response data, the second response data, and the plurality of third response data into first candidate data, second candidate data, and a plurality of third candidate data, respectively.

In an embodiment, the spot detector may further include a comparator configured to generate result data by comparing the first candidate data, the second candidate data, and the plurality of third candidate data, and a quantification unit configured to quantify a spot of the result data.

In an embodiment of the inventive concept, a display device include-a display panel, a first printed circuit board electrically connected to the display panel, and a memory mounted on the first printed circuit board, wherein the memory stores spot information detected based on first image data obtained by capturing a first image of a first grayscale of the display panel, second image data obtained by capturing a second image of a second grayscale different from the first grayscale, and a plurality of third image data obtained by capturing portions of the first image.

In an embodiment, the spot information may be information on a common spot included in all of a first spot group detected in the first image data, a second spot group detected in the second image data, and a third spot group detected in the plurality of third image data.

In an embodiment of the inventive concept, a spot detection method includes capturing a first image of a first grayscale displayed on a display panel to generate first image data, capturing a second image of a second grayscale different from the first grayscale displayed on the display panel to generate second image data, capturing portions of the first image to generate a plurality of third image data, and detecting a spot by the first image data, the second image data, and the plurality of third image data.

In an embodiment, the first image data and the plurality of third image data may be obtained by cameras disposed at different positions.

In an embodiment, the step of detecting the spot may include generating first intermediate data, second intermediate data, and a plurality of third intermediate data by filtering the first image data, the second image data, and the plurality of third image data by an intermediate value filter.

In an embodiment, the step of detecting the spot may further include morphologically processing the first intermediate data, the second intermediate data, and the plurality of third intermediate data to generate first response data, second response data, and a plurality of third response data.

In an embodiment, the step of detecting the spot may further include selecting a spot candidate from the first response data, the second response data, and the plurality of third response data to generate first candidate data, second candidate data, and a plurality of third candidate data.

In an embodiment, the step of detecting the spot may further include generating result data by comparing the first candidate data, the second candidate data, and the plurality of third candidate data, and quantifying a spot of the result data.

In an embodiment, the step of generating the result data may include generating first preliminary result data by removing a value not present in the second candidate data from the first candidate data, and generating the result data by removing a value not present in the plurality of third candidate data from the first preliminary result data.

BRIEF DESCRIPTION OF THE FIGURES

The accompanying drawings are included to provide a further understanding of the inventive concept, and are incorporated in and constitute a part of this specification. The drawings illustrate example embodiments of the present disclosure and, together with the description, serve to explain principles of the inventive concept. In the drawings:

FIG. 2 is a flowchart of a spot detection operation according to an embodiment of the present disclosure;

FIG. 5 is a top plan view of an imager according to an embodiment of the present disclosure;

FIG. 6A is an image corresponding to the first image data;

FIG. 7 is a block diagram of a spot detector according to an embodiment of the present disclosure;

FIG. 8B is a block diagram of an arithmetic processor according to an embodiment of the present disclosure;

FIG. 9A is an image corresponding to first response data;

FIG. 10B is an image corresponding to second candidate data;

FIG. 10C is an image corresponding to third candidate data;

FIG. 11 is a flowchart of an operation of generating result data according to an embodiment of the present disclosure;

FIG. 12 is an image corresponding to result data;

FIG. 14 is a display device according to an embodiment of the present disclosure.

DETAILED DESCRIPTION

Figure 1A:
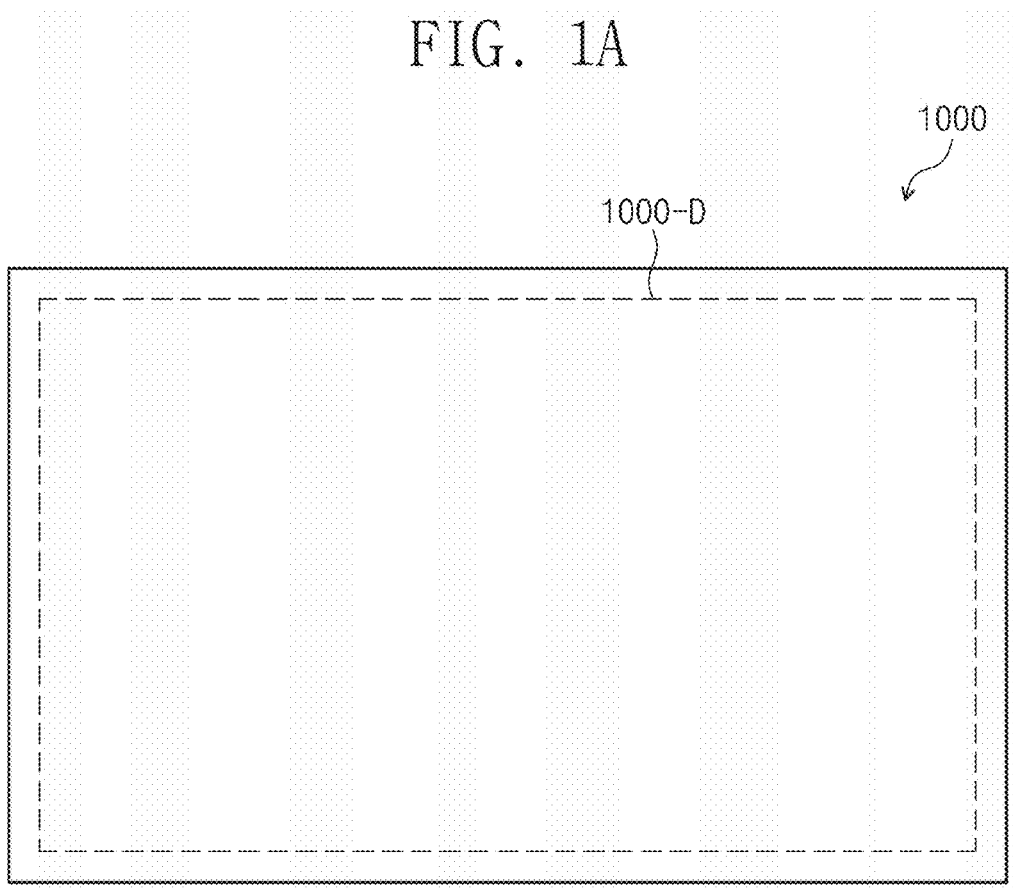
FIG. 1A is a top plan view of a display panel according to an embodiment of the present disclosure.

In this specification, when it is mentioned that a component (or, an area, a layer, a part, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description.

"And/or" includes all of one or more combinations defined by related components.

It will be understood that the terms "first" and "second" are used herein to describe various components but these components should not be limited by these terms. The above terms are used only to distinguish one component from another. For example, a first component may be referred to as a second component and vice versa without departing from the scope of the inventive concept. The singular expressions include plural expressions unless the context clearly dictates otherwise.

In addition, terms such as "below", "the lower side", "on", and "the upper side" are used to describe a relationship of configurations shown in the drawing. The terms are described as a relative concept based on a direction shown in the drawing.

Unless otherwise defined, all terms (including technical and scientific terms) used herein have the same meaning as terms commonly understood by those skilled in the art to which this invention belongs. In general, the terms defined in the dictionary should be considered to have the same meaning as the contextual meaning of the related art, and, unless clearly defined herein, should not be understood abnormally or as having an excessively formal meaning.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Figure 1B:
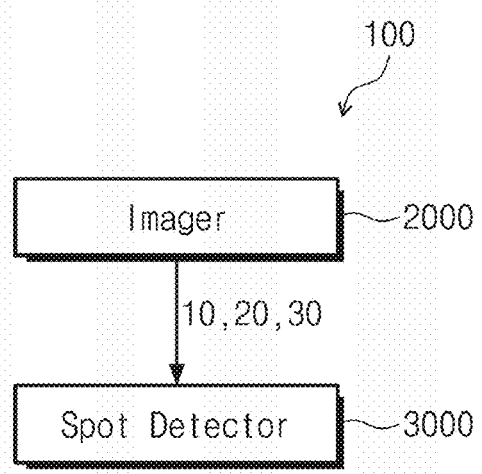
FIG. 1B is a block diagram of a spot inspection device according to an embodiment of the present disclosure.

FIG. 1A is a top plan view of a display panel according to an embodiment of the present disclosure. FIG. 1B is a block diagram of a spot inspection device according to an embodiment of the present disclosure.

Referring to FIGS. 1A and 1B, the display panel 1000 may be a device activated according to an electrical signal. The display panel 1000 may be included in various electronic devices. For example, the display panel 1000 may be used in medium-sized electronic devices such as personal computers, notebook computers, personal digital terminals, car navigation units, game machines, portable electronic devices, or cameras in addition to large-sized electronic devices such as televisions, monitors, or external billboards. In addition, these are simply suggested as embodiments and it is obvious that the display panel 1000 is employed in other electronic devices without departing from the scope of the present disclosure.

The display panel 1000 may display an image through the display area 1000-D. A plurality of pixels may be disposed in the display area 1000-D, and each of the plurality of pixels may include sub-pixels. The sub-pixels may be, for example, a red sub-pixel, a blue sub-pixel, and a green sub-pixel. However, this is merely an example, and colors of sub-pixels constituting one pixel may be variously changed.

Before the display panel 1000 is applied to the electronic device, an inspection for detecting a spot of the display panel 1000 may be performed. Thereafter, a correction value for compensating for the detected spot may be calculated, and the correction value may be stored in a memory. Therefore, the display panel 1000 may display an image in which the spot is corrected.

The spot inspection device 100 may be used to inspect a spot of the display panel 1000. The spot inspection device 100 may include an imager 2000 and a spot detector 3000 as depicted in FIG. 1B.

The imager 2000 may capture an image displayed by the display panel 1000. The imager 2000 may include at least one camera. For example, the display panel 1000 may display the first image of the first grayscale or the second image of the second grayscale. The imager 2000 may capture the first image and the second image. In addition, a portion of the first image may be captured. This will be described below in more detail.

The display panel 1000 displays the first image on the entire surface of the display area 1000-D during the first period, and displays the second image on the entire surface of the display area 1000-D during the second period. The first grayscale and the second grayscale may be different from each other. The second grayscale may be a grayscale adjacent to the first grayscale. For example, the first grayscale may be 64 grayscales, and the second grayscale may be 32 grayscales. Alternatively, the first grayscale may be 128 grayscales, and the second grayscale may be 64 grayscales. The first grayscale and the second grayscale may be changed according to the type of the display panel 1000 to be inspected.

The imager 2000 may generate a first image data 10 obtained by capturing the first image, a second image data 20 obtained by capturing the second image, and a third image data 30 obtained by capturing portions of the first image to the spot detector 3000. The third image data 30 may be data obtained by capturing the first image at an angle different from that of the first image data 10.

The spot detector 3000 may detect the spot by receiving the first image data 10, the second image data 20, and the third image data 30. The spot detector 3000 may be an arithmetic processing device. For example, the spot detector 3000 may be a graphics processing device.

FIG. 2 is a flowchart of a spot detection operation according to an embodiment of the present disclosure.

Referring to FIG. 2, the spot detection operation may include a step of generating first image data, second image data, and a plurality of third image data (S100), a step of generating first intermediate data, second intermediate data, and a plurality of third intermediate data by filtering the first image data, the second image data, and the plurality of third image data (S200), a step of generating first response data, second response data, and a plurality of third response data by performing a morphological operation on the first intermediate data, the second intermediate data, and the plurality of third intermediate data (S300), a step of generating first candidate data, second candidate data, and third candidate data by selecting a spot candidate from the first response data, the second response data, and the plurality of third response data (S400), a step of comparing the first candidate data, the second candidate data, and the third candidate data to generate result data (S500), and a step of quantifying the spot of the result data (S600). Each of the operations described above is described in detail below.

Figure 3A:
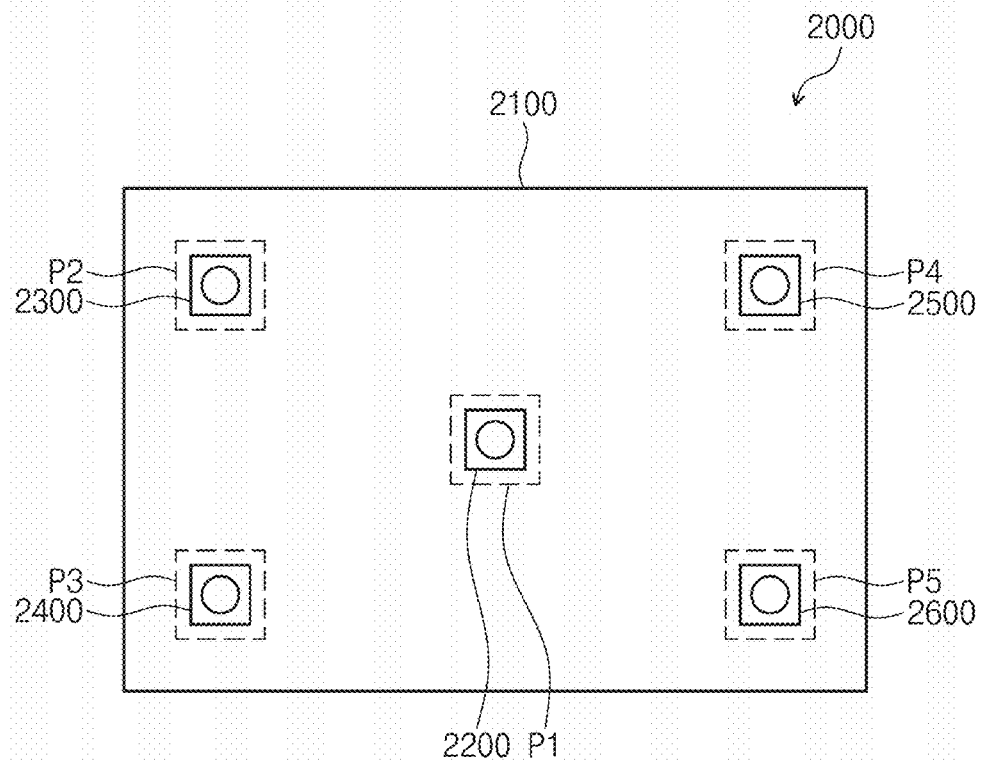
FIG. 3A is a top plan view of an imager according to an embodiment of the present disclosure.
Figure 3B:
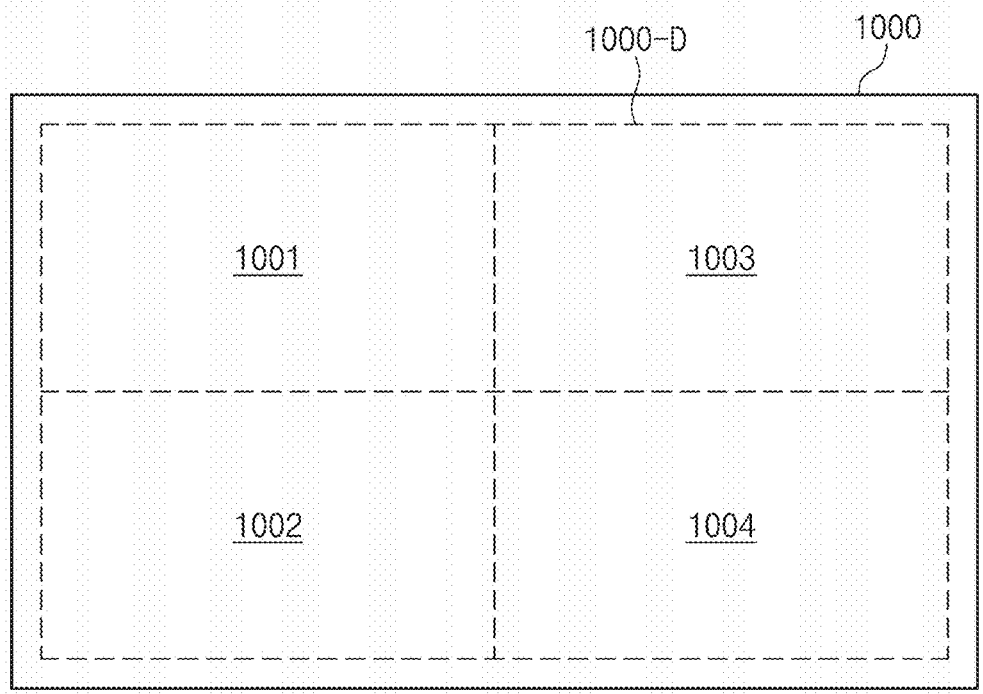
FIG. 3B is a top plan view of a display panel according to an embodiment of the present disclosure.

FIG. 3A is a top plan view of an imager according to an embodiment of the present disclosure. FIG. 3B is a top plan view of a display panel according to an embodiment of the present disclosure.

Referring to FIGS. 2, 3A, and 3B, an imager 2000 may be used to detect spots. Therefore, fine spots that are difficult to detect with naked eyes may also be easily detected by the imager 2000.

The first image data 10, the second image data 20, and the third image data 30 are generated using the imager 2000 (S100).

The imager 2000 may include a support jig 2100, a first camera 2200, a second camera 2300, a third camera 2400, and a fourth camera 2500.

In the support jig 2100, a first area P1, a second area P2, a third area P3, a fourth area P4, and a fifth area P5 may be defined. The first area P1 may be defined in the central area of the support jig 2100. The second to fifth areas P2, P3, P4, and P5 may be defined around the first area P1.

The first camera 2200, the second camera 2300, the third camera 2400, and the fourth camera 2500 may be mounted on the support jig 2100. For example, the first camera 2200 may be disposed on the first area P1, the second camera 2300 may be disposed on the second area P2, the third camera 2400 may be disposed on the third area P3, the fourth camera 2500 may be disposed on the fourth area P4, and the fifth camera 2600 may be disposed on the fifth area P5.

The first camera 2200 may capture the entire display area 1000-D of the display panel 1000. The first camera 2200 may generate the first image data 10 by capturing a first image of a first grayscale, and generate the second image data 20 by capturing a second image of a second grayscale.

According to an embodiment of the present disclosure, when a spot is detected by comparing two images of different grayscales, noise generated only in a specific grayscale may be removed. The noise is not a spot to be corrected.

The second, third, fourth, and fifth cameras 2300, 2400, 2500, and 2600 may generate the third image data 30 corresponding to portions of the display area 1000-D. For example, as depicted in FIG. 3B, the display area 1000-D may be divided into four sub display areas 1001, 1002, 1003, and 1004. The second, third, fourth, and fifth cameras 2300, 2400, 2500, and 2600 may capture the sub display areas 1001, 1002, 1003, and 1004, respectively, to generate third image data 30.

For example, the second camera 2300 captures the first image of the first grayscale displayed in the first sub area 1001 to generate the third image data 30. The third camera 2400 captures the first image of the first grayscale displayed in the second sub area 1002 to generate the third image data 30. The fourth camera 2500 captures the first image of the first grayscale displayed in the third sub area 1003 to generate the third image data 30. The fifth camera 2600 captures the first image of the first grayscale displayed in the fourth sub area 1004 to generate the third image data 30. The location of the sub area captured by each of the second, third, fourth, and fifth cameras 2300, 2400, 2500, and 2600 is not limited to the above example.

The first image data 10 and the third image data 30 may be data obtained by capturing a first image having the same first grayscale. However, the first image data 10 may be image data obtained by the first camera 2200 disposed in the first position, for example, the first area P1. The third image data 30 may be image data obtained by the second, third, fourth, and fifth cameras 2300, 2400, 2500, and 2600 disposed at positions different from the first position, for example, the second, third, fourth, and fifth areas P2, P3, P4, and P5.

The spot of the display panel 1000 itself is a spot visible at any angle, and is a spot to be corrected. However, since the protective film is a configuration removed from the final product, the scratch formed on the protective film is not a spot to be corrected. The scratch may or may not be visible depending on the viewing angle. According to the embodiment of the present disclosure, the spot may be detected by using image data obtained at positions where the angles of viewing the display panel 1000 are different from each other. Therefore, the probability of misrecognizing a scratch formed on a protective film (not shown) attached to the display panel 1000 as a spot, rather than a spot of the display panel 1000 itself, may be reduced.

Figure 4A:
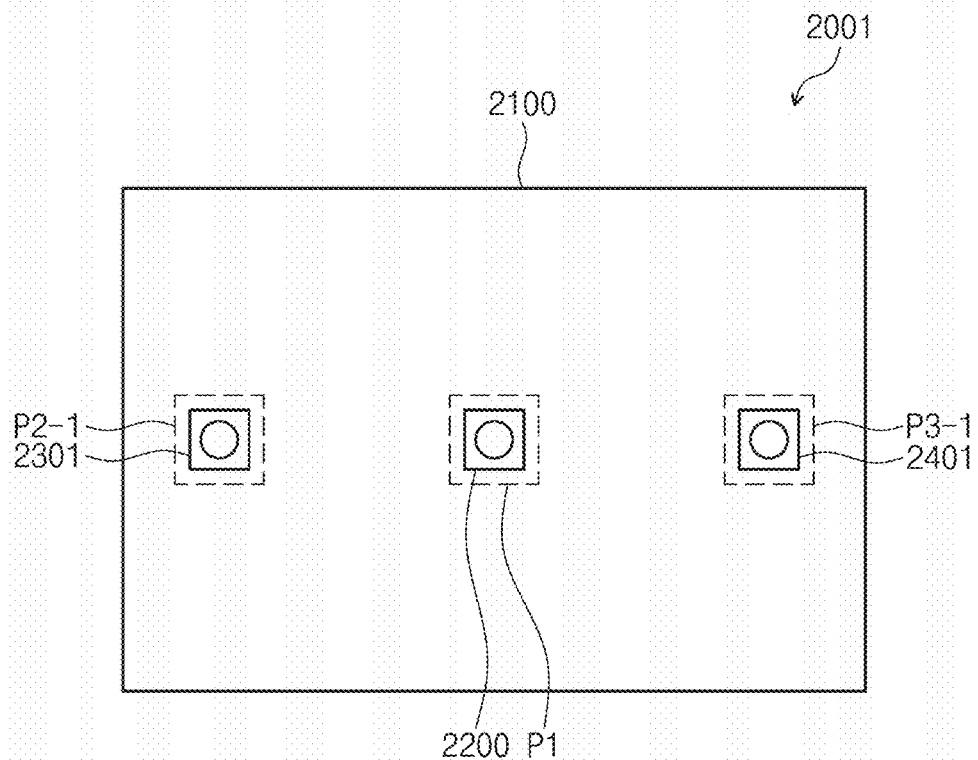
FIG. 4A is a top plan view of an imager according to an embodiment of the present disclosure.
Figure 4B:
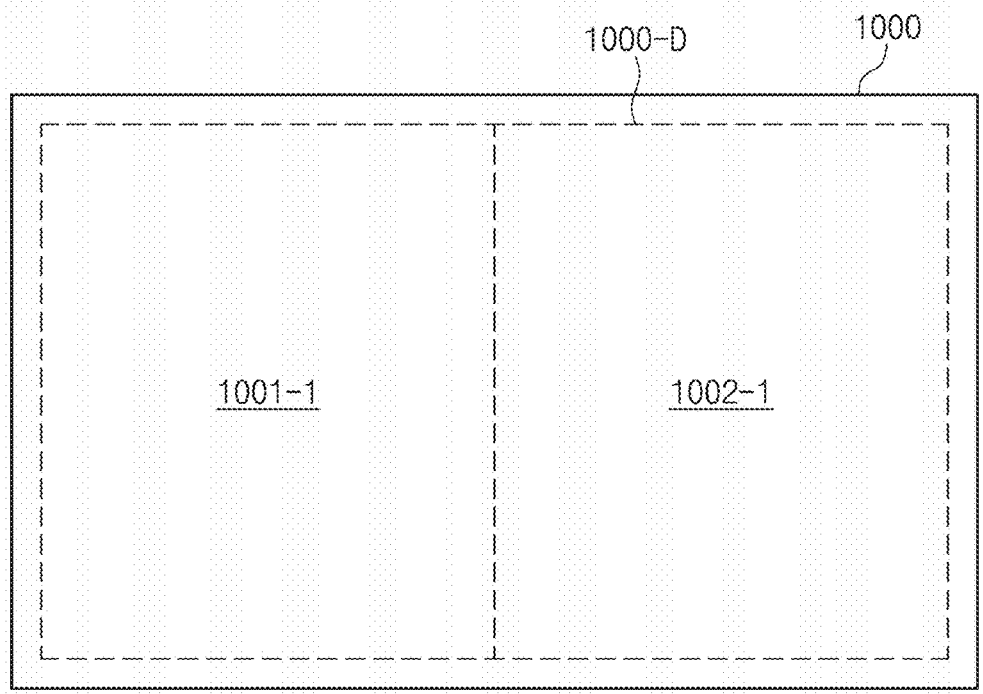
FIG. 4B is a top plan view of a display panel according to an embodiment of the present disclosure.

FIG. 4A is a top plan view of an imager according to an embodiment of the present disclosure. FIG. 4B is a top plan view of a display panel according to an embodiment of the present disclosure.

Referring to FIGS. 4A and 4B, the imager 2001 may include a support jig 2100, a first camera 2200, a second camera 2301, and a third camera 2401.

In the support jig 2100, a first area P1, a second area P2-1, and a third area P3-1 may be defined. The second area P2-1 and the third area P3-1 may be spaced apart from each other with respect to the first area P1 interposed between.

The first camera 2200 is disposed in the first area P1, the second camera 2301 is disposed in the second area P2-1, and the third camera 2401 is disposed in the third area P3-1. In one embodiment, the first, second, and third cameras 2200, 2301, and 2401 may be fixed to the first, second, and third areas P1, P2-1, and P3-1, but are not limited. For example, in one embodiment, the second camera 2301 and the third camera 2401 may be moved on the support jig 2100.

The first camera 2200 may capture the entire display area 1000-D of the display panel 1000. The first camera 2200 may generate the first image data 10 by capturing a first image of a first grayscale, and generate the second image data 20 by capturing a second image of a second grayscale.

The second camera 2301 and the third camera 2401 may generate the third image data 30 corresponding to portions of the display area 1000-D. The second camera 2301 may generate the third image data 30 by capturing the first image of the first grayscale displayed in the first sub area 1001-1, and the third camera 2401 may generate the third image data 30 by capturing the first image of the first grayscale displayed in the second sub area 1002-1.

In one embodiment, the third camera 2401 may be omitted. In this case, the second camera 2301 may capture an image of a portion of the display area 1000-D in the second area P2-1, and capture an image of another portion in the third area P3-1. That is, the position of the first camera 2200 may be fixed, and the second camera 2301 may be moved on the support jig 2100.

FIG. 5 is a top plan view of an imager according to an embodiment of the present disclosure.

Referring to FIG. 5, the imager 2001 may include a support jig 2100 and a camera 2200-1. The camera 2200-1 may be moved on the support jig 2100. For example, the camera 2200-1 may move between the first, second, third, fourth, and fifth areas P1, P2, P3, P4, and P5, and may capture the display panel 1000.

FIG. 6A is an image corresponding to the first image data. The image shown in FIG. 6A may be referred to as a detection grayscale image.

Referring to FIG. 6A, the first image data 10 may be captured and obtained by a camera disposed in the first area P1 of the support jig 2100. The first image data 10 may be data obtained by capturing a first image of a first grayscale. The first grayscale may be 64 grayscales, but is not limited.

Figure 6B:
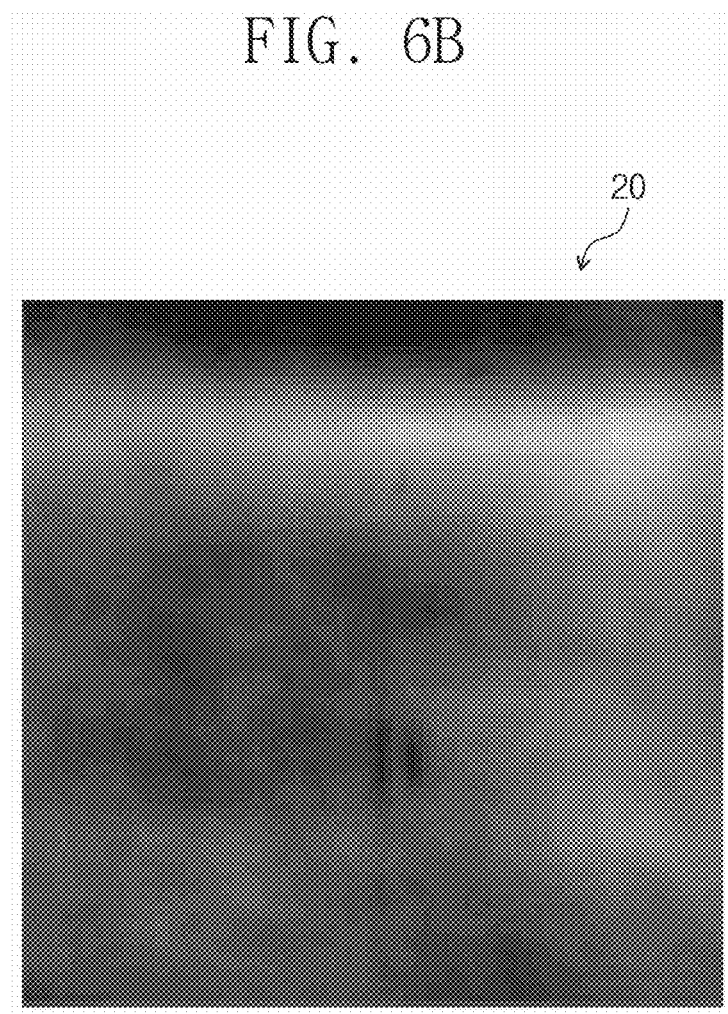
FIG. 6B is an image corresponding to the second image data.

FIG. 6B is an image corresponding to the second image data. The image shown in FIG. 6B may be referred to as a detection adjacent grayscale image.

Referring to FIG. 6B, the second image data 20 may be captured and obtained by a camera disposed in the first area P1 of the support jig 2100. The second image data 20 may be data obtained by capturing a second image of a second grayscale. The second grayscale may be 32 grayscales, but is not limited.

Figure 6C:
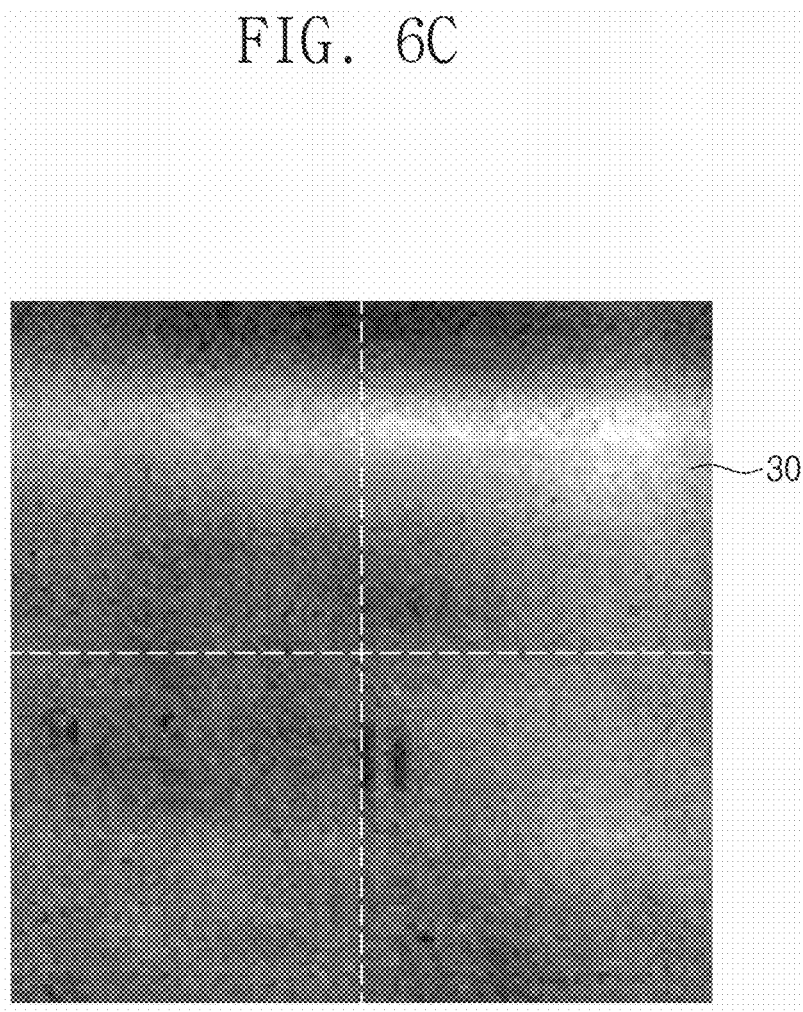
FIG. 6C is an image corresponding to the third image data.

FIG. 6C is an image corresponding to the third image data. The image shown in FIG. 6C may be referred to as a detection grayscale viewing angle image. The image of FIG. 6C may be an image obtained by a camera disposed at a position different from that of the camera of FIG. 6A.

Referring to FIG. 6C, the third image data 30 may be captured and obtained by cameras disposed in the second, third, fourth, and fifth areas P2, P3, P4, and P5 of the support jig 2100. The third image data 30 may be data obtained by capturing portions of the first image of the first grayscale. The first grayscale may be 64 grayscales, but is not limited.

FIG. 7 is a block diagram of a spot detector according to an embodiment of the present disclosure.

Referring to FIGS. 2 and 7, the spot detector 3000 may include a first filter 3100, an arithmetic processor 3200, a selector 3300, a comparator 3400, and a quantification unit 3500. The quantification unit 3500 may be referred to as a quantification circuit.

The first filter 3100 receives the first image data 10, the second image data 20, and the third image data 30. Thereafter, the first filter 3100 filters the first image data 10 to generate first intermediate data 11, filters the second image data 20 to generate second intermediate data 21, and filters the third image data 30 to generate third intermediate data 31 as shown in the step S200 of FIG. 2.

Impulsive noise may be removed by the first filter 3100. Impulsive noise may not be a spot to be corrected. The first filter 3100 may be an intermediate value filter. For example, the first filter 3100 may filter the first, second, and third image data 10, 20, and 30 using a 3*3 mask. The size of the mask is only presented as an example, and the size of the mask is not limited to the above example. In the present disclosure, a k*k mask may mean a mask having a size corresponding to horizontal k pixels and vertical k pixels.

Noise may be removed by the arithmetic processor 3200. Noise may not be a spot to be corrected. The arithmetic processor 3200 receives the first intermediate data 11, the second intermediate data 21, and the third intermediate data 31. The arithmetic processor 3200 generates the first response data 12 by performing a morphological operation on the first intermediate data 11, generates the second response data 22 by performing the morphological operation on the second intermediate data 21, and generates third response data 32 by performing a morphological operation on the third intermediate data 31 as shown in the step S300 of FIG. 2.

Figure 8A:
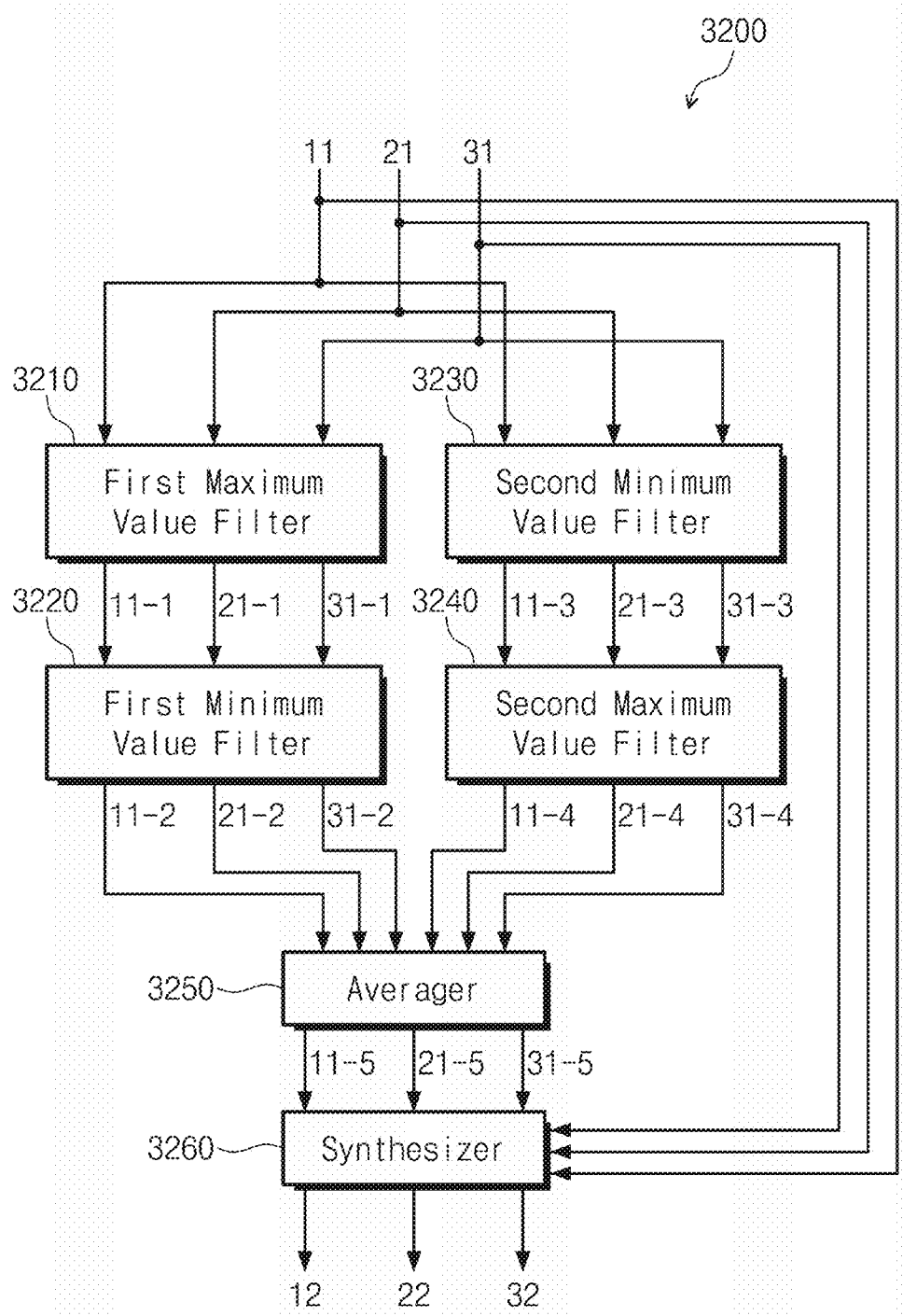
FIG. 8A is a block diagram of an arithmetic processor according to an embodiment of the present disclosure.

FIG. 8A is a block diagram of an arithmetic processor according to an embodiment of the present disclosure.

Referring to FIG. 8A, the arithmetic processor 3200 may include a first maximum value filter 3210, a first minimum value filter 3220, a second minimum value filter 3230, and a second maximum value filter 3240, an averager 3250, and a synthesizer 3260.

The first maximum value filter 3210 filters the first intermediate data 11, the second intermediate data 21, and the plurality of third intermediate data 31 using a first mask of a*a size. For example, the first maximum value filter 3210 may produce a first intermediate data 11-1 by maximally filtering the first intermediate data 11 using the first mask, produce a second intermediate data 21-1 by maximally filtering the second intermediate data 21 using the first mask, and output the third intermediate data 31-1 by maximally filtering the third intermediate data 31 using the first mask. The first, second, and third intermediate data 11-1, 21-1, and 31-1 may be referred to as a set of data.

The first minimum value filter 3220 may filter the first, second, and third intermediate data 11-1, 21-1, and 31-1 by using a second mask having a size of 2a+1*2a+1. For example, the first minimum value filter 3220 may minimally filter the first, second, and third intermediate data 11-1, 21-1, and 31-1 using the second mask to produce the first, second, and third intermediate data 11-2, 21-2, and 31-2. The first, second, and third intermediate data 11-2, 21-2, and 31-2 may be referred to as a set of data.

The second minimum value filter 3230 may filter the first, second, and third intermediate data 11, 21, and 31 using a first mask having a*a size. For example, the second minimum value filter 3230 may minimally filter the first, second, and third intermediate data 11, 21, and 31 using the first mask to produce the first, second, and third intermediate data 11-3, 21-3, and 31-3. The first, second, and third intermediate data 11-3, 21-3, and 31-3 may be referred to as a set of data.

The second maximum value filter 3240 may filter the first, second, and third intermediate data 11-3, 21-3, and 31-3 by using a second mask having a size of 2a+1*2a+1. For example, the second minimum value filter 3230 may maximally filter the first, second, and third intermediate data 11-3, 21-3, and 31-3 using the second mask to produce the first, second, and third intermediate data 11-4, 21-4, and 31-4. The first, second, and third intermediate data 11-4, 21-4, and 31-4 may be referred to as a set of data.

The averager 3250 receives the first, second, and third intermediate data 11-2, 21-2, and 31-2 from the first minimum value filter 3220 and the first, second, and third intermediate data 11-4, 21-4, and 31-4 from the second maximum value filter 3240. The averager 3250 may produce the first intermediate data 11-5 by averaging the first intermediate data 11-2 and the first intermediate data 11-4, produce the second intermediate data 21-5 by averaging the second intermediate data 21-2 and the second intermediate data 21-4, and produce the third intermediate data 31-5 by averaging the third intermediate data 31-2 and the third intermediate data 31-4.

The synthesizer 3260 receives the first, second, and third intermediate data 11, 21, and 31 and the first, second, and third intermediate data 11-5, 21-5, and 31-5 from the averager 3250. The synthesizer 3260 removes the first intermediate data 11-5 from the first intermediate data 11, and then produces the first response data 12, removes the second intermediate data 21-5 from the second intermediate data 21 and produces second response data 22, and removes the third intermediate data 31-5 from the third intermediate data 31 and produces the third response data 32.

FIG. 8B is a block diagram of an arithmetic processor according to an embodiment of the present disclosure.

Referring to FIG. 8B, the arithmetic processor 3201 may include a second filter 3211, a third filter 3221, and a synthesizer 3321.

The second filter 3211 may filter the first, second, and third intermediate data 11, 21, and 31 to produce the first, second, and third intermediate data 11-a, 21-a, and 31-a. The third filter 3221 may filter the first, second, and third intermediate data 11-a, 21-a, and 31-a to produce the first, second, and third intermediate data 11-b, 21-b, and 31-b.

The synthesizer 3231 receives the first, second, and third intermediate data 11, 21, and 31 and the first, second, and third intermediate data 11-b, 21-b, and 31-b. The synthesizer 3231 removes the first, second and third intermediate data 11-b, 21-b, and 31-b from the first, second, and third intermediate data 11, 21, and 31, respectively to produce third response data 12, 22, and 32.

In one embodiment, the second filter 3211 may be the first maximum value filter 3210 described with reference to FIG. 8A, and the third filter 3221 may be the first minimum value filter 3220 described with reference to FIG. 8A.

In one embodiment, the second filter 3211 may be the second minimum value filter 3230 described with reference to FIG. 8A, and the third filter 3221 is the second maximum value filter 3240 described with reference to FIG. 8A.

Figure 9B:
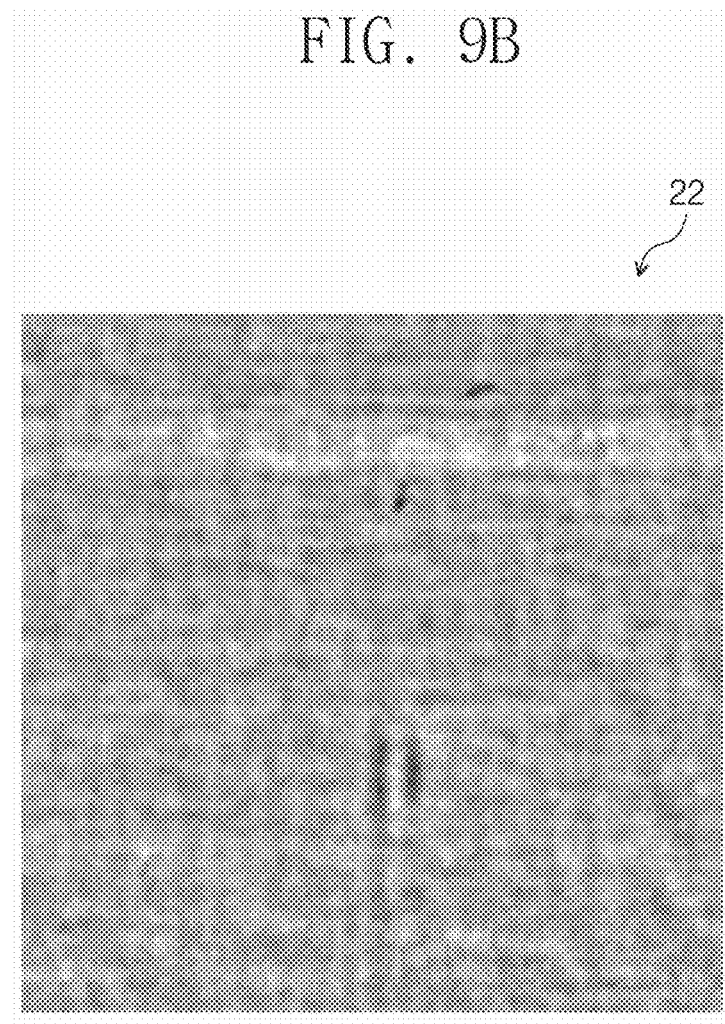
FIG. 9B is an image corresponding to second response data.
Figure 9C:
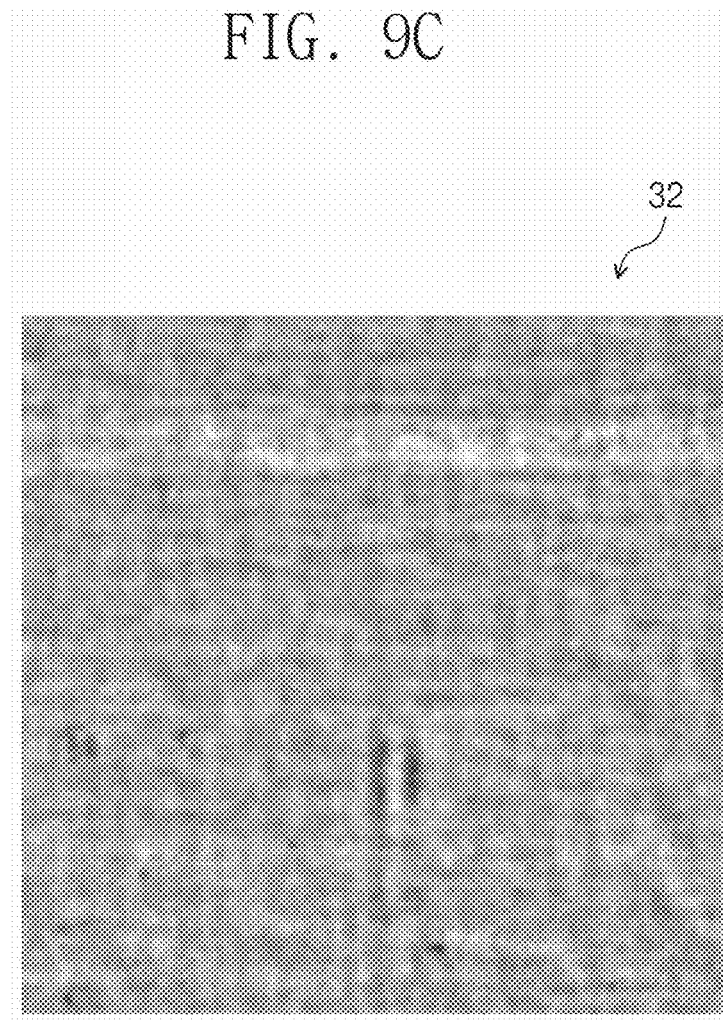
FIG. 9C is an image corresponding to third response data.

The arithmetic processor 3200 may highlight spots that are correction candidates and remove noises (see FIG. 7). FIG. 9A is an image corresponding to the first response data 12 from which noises are removed. FIG. 9B is an image corresponding to the second response data 22 from which noises are removed. FIG. 9C is an image corresponding to the third response data 32 from which noises are removed.

Referring back to FIGS. 2 and 7, the selector 3300 receives the first response data 12, the second response data 22, and the third response data 32 from the arithmetic processor 3200. The selector 3300 selects a spot candidate of the first response data 12 to generate the first candidate data 13, selects a spot candidate of the second response data 22 to generate the second candidate data 23, and selects a spot candidate of the third response data 32 to generate the third candidate data 33 as shown in the step S400 of FIG. 2.

The selector 3300 may use an adaptive threshold to generate the first, second, and third candidate data 13, 23, and 33. For example, the selector 3300 may select a spot candidate that is darker or brighter than the average luminance value. For example, the values selected as spot candidates may be outside the standard deviation range.

Figure 10A:
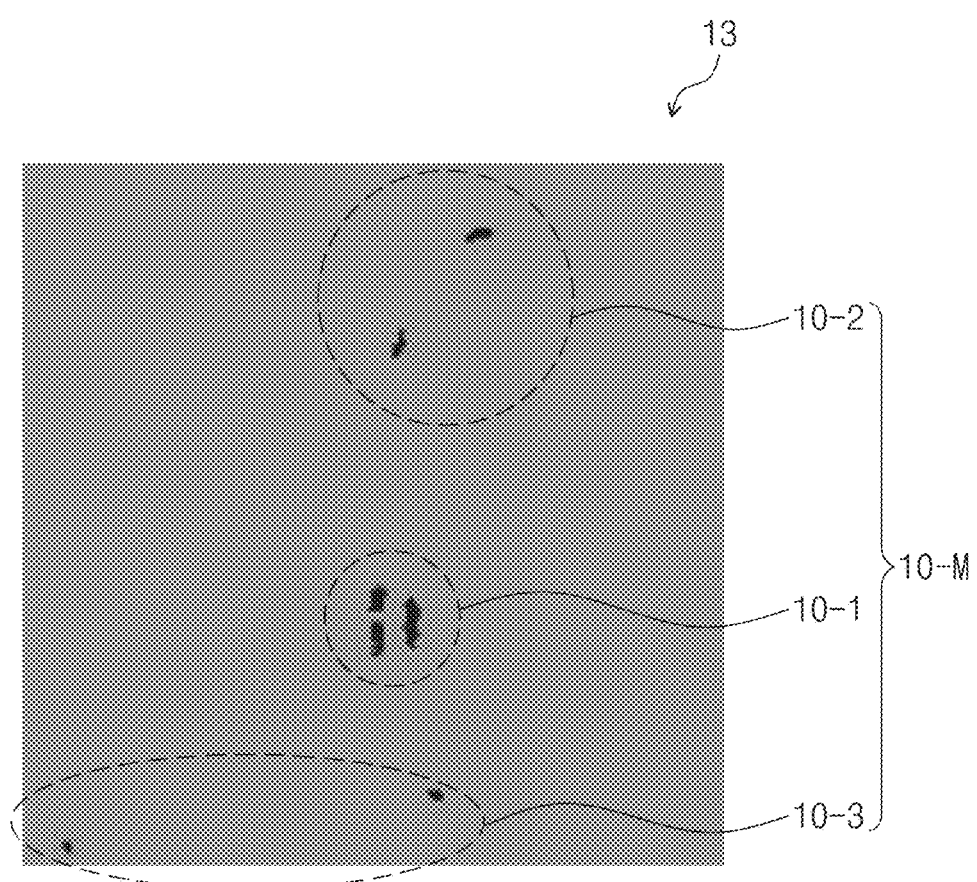
FIG. 10A is an image corresponding to first candidate data.

FIG. 10A is an image corresponding to the first candidate data 13. FIG. 10B is an image corresponding to the second candidate data 23. FIG. 10C is an image corresponding to the third candidate data 33.

The first candidate data 13 may include information on a first spot group 10-M, the second candidate data 23 may include information on a second spot group 20-M, and the third candidate data 33 may include information on a third spot group 30-M.

The first spot group 10-M may be configured of spots detected from the first image data 10 (see FIG. 1B). The first spot group 10-M may include a first spot 10-1, a second spot 10-2, and a third spot 10-3.

The first spot 10-1 may be a spot of the display panel 1000 (see FIG. 1A) or may be a spot to be corrected. The second spot 10-2 may be a scratch formed on a film additionally attached to the display panel 1000. The third spot 10-3 may be specific grayscale noise seen at the first grayscale.

The second spot group 20-M may be configured of spots detected from the second image data 20 (see FIG. 1B). The second spot group 20-M may include a first spot 20-1 and a second spot 20-2. The first spot 20-1 may be a spot of the display panel 1000 (see FIG. 1A) or may be a spot to be corrected. The second spot 20-2 may be a scratch formed on a film additionally attached to the display panel 1000.

The second spot group 20-M is a group composed of spots detected from data obtained by capturing an image of a second grayscale different from the first grayscale. Thus, the second spot group 20-M may not include specific grayscale noise seen at the first grayscale, for example, the third spot 10-3.

The third spot group 30-M may be configured of spots detected from the third image data 30 (see FIG. 1B). The third spot group 30-M may include a first spot 30-1 and a second spot 30-2. The first spot 30-1 may be a spot of the display panel 1000 (see FIG. 1A) or may be a spot to be corrected. The second spot 30-2 may be specific grayscale noise seen at the first grayscale.

The third spot group 30-M is a spot detected from the third image data 30 captured by the camera at a position different from the position of the camera that obtains the first image data 10. Physical damage such as scratches may or may not be visible depending on the viewing angle or location of the camera. Accordingly, the third spot group 30-M may not include scratches, for example, the second spot 10-2.

Referring to FIGS. 2 and 7, the comparator 3400 receives the first candidate data 13, the second candidate data 23, and the third candidate data 33. The comparator 3400 generates a result data 40 by comparing the first, second, and third candidate data 13, 23, and 33 as shown in the step S500 of FIG. 2.

FIG. 11 is a flowchart of an operation of generating the result data 40 according to an embodiment of the present disclosure.

Referring to FIGS. 2, 7, and 11, the step of generating of the result data 40 (step S500) includes generating a first preliminary result data by removing values not present in the second candidate data 23 from the first candidate data 13 (step S510) and generating result data 40 by removing values not present in the third candidate data 33 from the first preliminary result data (step S520). Each of the values not present in the second candidate data 23 and the values not present in the third candidate data 33 may be singular or absent.

FIG. 12 is an image corresponding to the result data 40. The result data 40 may include information corresponding to a common spot 40-M. The common spot 40-M may be a spot that is included in all of the first spot group 10-M (see FIG. 10A), the second spot group 20-M (see FIG. 10B), and the third spot group 30-M (see FIG. 10C).

Referring back to FIGS. 2 and 7, the quantification unit 3500 receives result data 40. The quantification unit 3500 quantifies the spot of the result data 40 as shown in the step S600 of FIG. 2.

Figure 13:
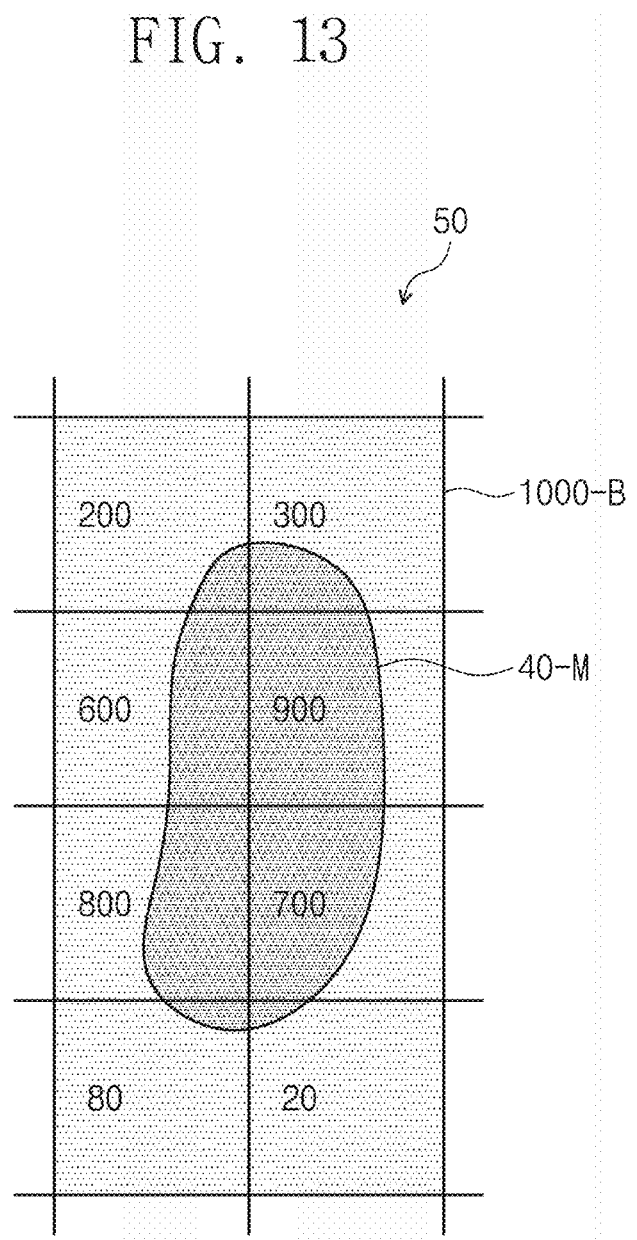
FIG. 13 is a diagram illustrating an example of quantifying the result data.

FIG. 13 is a diagram illustrating an example of quantifying the result data 40.

Referring to FIG. 13, the quantification unit 3500 (see FIG. 7) may score the degree of a spot. A reaction map 50 that scores the intensity of the common spot 40-M is shown as an example.

The reaction map 50 may include data scored by block units. One block 1000-B may include 8*8 pixels. However, the unit constituting one block 1000-B is not limited to the above example.

According to an embodiment of the present disclosure, it is possible to select a correction target spot from the block having the highest score. For example, when a total of three blocks are selected as spot correction targets, three blocks having 900, 800, and 700 points, may be selected as spot correction targets in order to get the highest score.

FIG. 14 is a display device according to an embodiment of the present disclosure.

Referring to FIG. 14, the display device DD may include a display panel 1000, first connection films 1100, a first printed circuit board 1200, a memory 1300, a second connection film 1400, a second printed circuit board 1500, and a timing controller 1600.

The first connection films 1100 may be electrically connected to the display panel 1000. Each of the first connection films 1100 may be a tape carrier package film or a chip on film.

The first printed circuit board 1200 may be electrically connected to the display panel 1000 through the first connection films 1100. The memory 1300 may be mounted on the first printed circuit board 1200. Information on a spot selected as a correction target may be stored in the memory 1300.

The second connection film 1400 may electrically connect the first printed circuit board 1200 and the second printed circuit board 1500. The timing controller 1600 may be mounted on the second printed circuit board 1500.

The timing controller 1600 may receive spot information from the memory 1300 and then correct image data received from the outside. Therefore, the display quality of the display device DD may be improved.

According to the present disclosure, a spot may be detected using image data obtained from two images having different grayscales and image data obtained at the positions where angles of viewing the display panel are different. Accordingly, it is possible to prevent determining noise and scratches that only occur at specific grayscales, which are not spots, as spots. Therefore, a spot detection device and a spot detection method with improved reliability may be provided. In addition, as a display device having information on spots detected by using the same is provided, display image quality of the display device may be improved.

Although the example embodiments of the inventive concept have been described, it is understood that the inventive concept should not be limited to these example embodiments but various changes and modifications may be made by one ordinary skilled in the art within the spirit and scope of the present disclosure as hereinafter claimed.

What is claimed is:

1. A spot detection device comprising:
an imager configured to capture a display panel displaying a first image of a first grayscale at a first angle and a second image of a second grayscale different from the first grayscale and generate a plurality of image data; and
a spot detector configured to receive the plurality of image data from the imager in order to detect a spot,
wherein the plurality of image data comprises first image data obtained by capturing a whole of the first image, second image data obtained by capturing a whole of the second image, and a plurality of third image data obtained by capturing portions of the first image at second angles different from the first angle, respectively.

2. The spot detection device of claim 1, wherein the imager comprises a first camera for capturing an entire display area of the display panel, and a second camera for capturing one portion of the display area.

3. The spot detection device of claim 2, wherein the imager further comprises a third camera for capturing another portion of the display area.

4. The spot detection device of claim 2, wherein the second camera captures one portion of the display area from a first position, and captures another portion of the display area from a second position different from the first position.

5. The spot detection device of claim 1, wherein the imager comprises a camera,
wherein the camera obtains the first image data and the second image data from a first position, and obtains at least some of the plurality of third image data from a second position different from the first position.

6. The spot detection device of claim 1, wherein the spot detector comprises a first filter for removing impulsive noise from the first image data, the second image data, and the plurality of third image data,
wherein the first filter converts the first image data, the second image data, and the plurality of third image data into first intermediate data, second intermediate data, and a plurality of third intermediate data, respectively, through an intermediate value filter.

7. The spot detection device of claim 6, wherein the spot detector further comprises an arithmetic processor for removing noise from the first intermediate data, the second intermediate data, and the plurality of third intermediate data,
wherein the arithmetic processor converts the first intermediate data, the second intermediate data, and the plurality of third intermediate data into first response data, second response data, and a plurality of third response data, respectively, through a morphological operation process.

8. The spot detection device of claim 7, wherein the arithmetic processor comprises:
a first maximum value filter configured to filter the first intermediate data, the second intermediate data, and the plurality of third intermediate data with a mask having a size of $a*a$;
a first minimum value filter configured to filter a set of data filtered by the first maximum value filter with a mask having a size of $(2a+1)*(2a+1)$;
a second minimum value filter configured to filter the first intermediate data, the second intermediate data, and the plurality of third intermediate data with a mask having a size of $a*a$;
a second maximum value filter configured to filter a set of data filtered by the second minimum value filter with a mask having a size of $(2a+1)*(2a+1)$;
an averager configured to average data filtered by the first minimum value filter and corresponding data filtered by the second maximum value filter; and
a synthesizer configured to generate the first response data, the second response data, and the plurality of third response data by respectively removing corresponding average data derived by the averager from the first intermediate data, the second intermediate data, and the plurality of third intermediate data.

9. The spot detection device of claim 7, wherein the arithmetic processor comprises:
a second filter configured to filter the first intermediate data, the second intermediate data, and the plurality of third intermediate data with a mask having a size of $a*a$;
a third filter configured to filter a set of data filtered by the second filter with a mask having a size of $(2a+1)*(2a+1)$; and
a synthesizer configured to generate the first response data, the second response data, and the plurality of third response data by removing corresponding data filtered by the third filter from the first intermediate data, the second intermediate data, and the plurality of third intermediate data, respectively.

10. The spot detection device of claim 7, wherein the spot detector further comprises a selector configured to select a spot candidate of the first response data, the second response data, and the plurality of third response data,
wherein the selector converts the first response data, the second response data, and the plurality of third response data into first candidate data, second candidate data, and a plurality of third candidate data, respectively.

11. The spot detection device of claim 10, wherein the spot detector further comprises a comparator configured to generate result data by comparing the first candidate data, the second candidate data, and the plurality of third candidate data, and a quantification unit configured to quantify a spot of the result data.

12. A display device comprising:
a display panel;
a first printed circuit board electrically connected to the display panel; and
a memory mounted on the first printed circuit board, wherein the memory stores spot information detected based on first image data obtained by capturing a whole of a first image of a first grayscale displayed on the display panel at a first angle, second image data obtained by capturing a whole of a second image of a second grayscale different from the first grayscale displayed on the display panel, and a plurality of third image data obtained by capturing portions of the first image at second angles different from the first angle, respectively.

13. The display device of claim 12, wherein the spot information is information on a common spot included in all of a first spot group detected in the first image data, a second spot group detected in the second image data, and a third spot group detected in the plurality of third image data.

14. A spot detection method comprising:
capturing a whole of a first image of a first grayscale displayed on a display panel at a first angle to generate first image data;
capturing a whole of a second image of a second grayscale different from the first grayscale displayed on the display panel to generate second image data;
capturing portions of the first image at second angles different from the first angle, respectively, to generate a plurality of third image data; and
detecting a spot by the first image data, the second image data, and the plurality of third image data.

15. The method of claim 14, wherein the first image data is obtained by a first camera disposed at a first position, and
the plurality of third image data are respectively obtained by the first camera moved to positions different from the first position or respectively obtained by second cameras disposed at positions different from the first position.

16. The method of claim 14, wherein the step of detecting the spot comprises generating first intermediate data, second intermediate data, and a plurality of third intermediate data by filtering the first image data, the second image data, and the plurality of third image data by an intermediate value filter.

17. The method of claim 16, wherein the step of detecting the spot further comprises morphologically processing the first intermediate data, the second intermediate data, and the plurality of third intermediate data to generate first response data, second response data, and a plurality of third response data.

18. The method of claim 17, wherein the step of detecting the spot further comprises selecting a spot candidate from the first response data, the second response data, and the plurality of third response data to generate first candidate data, second candidate data, and a plurality of third candidate data.

19. The method of claim 18, wherein the step of detecting the spot further comprises generating result data by comparing the first candidate data, the second candidate data, and the plurality of third candidate data, and quantifying a spot of the result data.

20. The method of claim 19, wherein the step of generating the result data comprises:
generating first preliminary result data by removing a value not present in the second candidate data from the first candidate data; and
generating the result data by removing a value not present in the plurality of third candidate data from the first preliminary result data.

* * * * *